(12) United States Patent
Cheng et al.

(10) Patent No.: US 7,734,685 B2
(45) Date of Patent: Jun. 8, 2010

(54) METHOD, SYSTEM AND PROGRAM PRODUCT FOR ANNOTATING A DEVELOPMENT ARTIFACT

(75) Inventors: Li-Te Cheng, Malden, MA (US); Susanne Hupfer, Lexington, MA (US); John F. Patterson, Carlisle, MA (US); Steven I. Ross, S. Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 10/899,627

(22) Filed: Jul. 27, 2004

(65) Prior Publication Data

US 2006/0026251 A1 Feb. 2, 2006

(51) Int. Cl.
*G06F 15/16* (2006.01)
(52) U.S. Cl. .................. 709/203; 709/204; 709/205
(58) Field of Classification Search ............... 709/203, 709/204, 205
See application file for complete search history.

(56) References Cited

U.S. PATENT DOCUMENTS

| | | | |
|---|---|---|---|
| 7,089,278 B1 * | 8/2006 | Churchill et al. ............ 709/203 |
| 2002/0002562 A1 * | 1/2002 | Moran et al. ................ 707/500 |
| 2002/0065798 A1 * | 5/2002 | Bostleman et al. ............ 707/1 |
| 2004/0068521 A1 * | 4/2004 | Haacke et al. ................ 707/200 |
| 2006/0080432 A1 * | 4/2006 | Spataro et al. ............... 709/224 |

OTHER PUBLICATIONS

Thomas Erickson et al., "Socially Translucent Systems: Social Proxies, Persistent Conversation, and the Design of 'Babble'", Proceedings of CHI 1999, printed from http://www.pliant.org/personal/Tom_Erickson/loops.chi99.paper.html, 1999, pp. 1-14.

Mark Singley et al., "Algebra Jam: Supporting Teamwork and Managing Roles in a Collaborative Learning Environment", Proceedings of CSCW 2000, Dec. 2-6, 2000, pp. 145-154.

Elizabeth Churchill et al., "Anchored Conversations: Chatting in the context of a document", CHI Letters, 2000, pp. 454-461 vol. 2, Issue 1.

J.J. Cadiz et al., "Using Web Annotations for Asynchronous Collaboration Around Documents", Proceedings of CSCW 2000, Dec. 2-6, 2000, pp. 309-318.

Chyng Yang Jang et al., "Supporting Awareness among Virtual Teams in a Web-Based Collaborative System: The TeamSCOPE System", ACM SIGGROUP Bulletin, Dec. 2000, pp. 28-34 (1-8), vol. 21, Issue 3.

Jay Budzik et al., "Supporting Online Resource Discovery in the Context of Ongoing Tasks with Proactive Assistants", International Journal of Human-Computer Studies, 2002, pp. 47-74 (1-30), vol. 56, Issue 1.

A.J. Bernheim Brush, "Annotating Digital Documents: Anchoring, Educational Use, and Notification", CHI' 02 extended abstracts on Human factors in computing systems, 2002, pp. 542-543.

* cited by examiner

*Primary Examiner*—Rupal D Dharia
*Assistant Examiner*—Adnan Mirza
(74) *Attorney, Agent, or Firm*—Ayla Lari; Hoffman Warnick LLC (57) ABSTRACT

An improved solution for managing a project. In particular, one or more development artifacts for the project can be annotated based on a collaborative session regarding the development artifact(s). The collaborative session can be stored as a collaborative artifact, which also can be stored in the project. As a result, the collaborative session can be readily recalled and/or subsequently resumed by one or more users.

11 Claims, 4 Drawing Sheets

METHOD, SYSTEM AND PROGRAM PRODUCT FOR ANNOTATING A DEVELOPMENT ARTIFACT

BACKGROUND OF THE INVENTION

1. Technical Field

The invention relates generally to annotating a development artifact. Specifically, under the present invention, a development artifact can be annotated with information on one or more collaborative sessions regarding the development artifact.

2. Background Art

Integrated Development Environments (IDEs), such as Websphere® Studio Application Developer offered by International Business Machines (IBM) Corp. of Armonk, N.Y., provide the primary workplace for completing a project, such as the development of a software product. To this extent, a typical IDE provides tools to manage and manipulate several types of development artifacts. For example, in software development, development artifacts can include models, source code files, function libraries, tasks, test cases, activities, etc.

Frequently, multiple individuals contribute to completing any given project. In this case, two or more individuals may collaborate regarding one or more of the development artifacts. For example, two software developers may discuss a particular section of source code. To date, in order to collaborate, individuals must use a collaborative approach that is provided apart from the IDE. Typical collaborative approaches include an in-person conversation, electronic mail, a telephone conversation, a discussion forum, instant messaging (e.g., text chat, voice chat), and the like.

Each of these collaborative approaches has several drawbacks. In particular, each approach requires that the individuals leave the context of the IDE environment. As a result, time is wasted in leaving and returning to the IDE environment, and project information managed by the IDE may not be fully exploited during the collaboration. Further, a record of the collaboration may not be saved and/or may not be readily linked with the development artifact that was discussed. As a result, knowledge that is obtained as a result of the collaboration may be forgotten and/or may not be efficiently disseminated to one or more other individuals contributing to the project.

Within existing IDE environments, several approaches can be used to incorporate some record of the collaboration into the project. For example, an activity tracking system, such as Rational® ClearQuest® offered by IBM Corp., can be used to manage various project-related activities. However, this approach requires an individual to spend additional time in entering a report, and may be overly formal and structured for many collaborations. Further, a textual comment can be added when a development artifact is "checked in" or "checked out" of an artifact management system, such as Rational® ClearCase® offered by IBM Corp. This approach is limited since the comment can only be entered when interacting with the artifact management system, which may occur at a time that is remote from a particular collaboration. Moreover, the collaboration can only be linked to one or more development artifacts, and not to a particular region of an artifact that was discussed during collaboration. Still further, the content of the collaboration can be included in the development artifact itself (e.g., as a comment in source code). However, in addition to being time consuming and occurring apart from the collaboration, this approach may not be desirable when the development artifact is to be provided to customers.

As a result, a need exists for a solution for annotating a development artifact. In particular, a need exists for a method, system and program product that can record a collaborative session between two or more individuals and associate the collaborative session with the corresponding development artifact. To this extent, there exists a need for an IDE that incorporates collaboration functionality, and a project that includes collaboration data that is associated with one or more corresponding development artifacts.

SUMMARY OF THE INVENTION

The invention provides a solution in which a development artifact can be annotated with collaboration data. Specifically, under the present invention, a collaborative session between a plurality of users can be recorded and stored as a collaboration artifact. The collaboration artifact can be associated with the corresponding development artifact(s) and/or one or more regions of the development artifact(s). When the development artifact is subsequently displayed, an indicator can be displayed to indicate that a collaboration artifact is associated with the region/development artifact. A user can then select to view and/or listen to the data in the collaboration artifact, resume the collaborative session, or the like. The collaboration artifact and the corresponding associations can be stored as part of a project along with the development artifact(s).

A first aspect of the invention provides a method of annotating a development artifact, the method comprising: obtaining the development artifact from a set of artifacts; initiating a collaborative session between at least two users; recording the collaborative session as a collaboration artifact; and associating the collaboration artifact with the development artifact.

A second aspect of the invention provides a method of annotating a region of a development artifact, the method comprising: obtaining a region of the development artifact; initiating a collaborative session between at least two users; assisting the collaborative session based on the region; recording the collaborative session as a collaboration artifact; and associating the collaboration artifact with the development artifact.

A third aspect of the invention provides a system for annotating a development artifact, the system comprising: a development system for managing the development artifact; a collaboration system for managing a collaborative session between at least two users; and an association system for associating the collaborative session with the development artifact.

A fourth aspect of the invention provides an integrated development environment (IDE) comprising: an artifact system for managing a set of artifacts, wherein the set of artifacts includes a set of development artifacts and a set of collaboration artifacts; a development system for managing the set of development artifacts; a collaboration system for managing the set of collaboration artifacts; and an association system for associating the set of collaboration artifacts with the set of development artifacts.

A fifth aspect of the invention provides a software project stored on a recordable medium, the software project comprising: a set of development artifacts that includes at least one source file; and a set of collaboration artifacts that includes at least one collaborative session that is associated with the at least one source file.

A sixth aspect of the invention provides a program product stored on a recordable medium for annotating a development artifact, which when executed comprises: program code for obtaining the development artifact from a set of artifacts; program code for initiating a collaborative session between at least two users; program code for recording the collaborative session as a collaboration artifact; and program code for associating the collaboration artifact with the development artifact.

A seventh aspect of the invention provides a system for deploying an application for annotating a development artifact, the system comprising: a computer infrastructure being operable to: obtain the development artifact from a set of artifacts; initiate a collaborative session between at least two users; record the collaborative session as a collaboration artifact; and associate the collaboration artifact with the development artifact.

An eighth aspect of the invention provides computer software embodied in a propagated signal for annotating a development artifact, the computer software comprising instructions to cause a computer system to perform the following functions: obtain the development artifact from a set of artifacts; initiate a collaborative session between at least two users; record the collaborative session as a collaboration artifact; and associate the collaboration artifact with the development artifact.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution in which a development artifact can be annotated with collaboration data. Specifically, under the present invention, a collaborative session between a plurality of users can be recorded and stored as a collaboration artifact. The collaboration artifact can be associated with the corresponding development artifact(s) and/or one or more regions of the development artifact(s). When the development artifact is subsequently displayed, an indicator can be displayed to indicate that a collaboration artifact is associated with the region/development artifact. A user can then select to view and/or listen to the data in the collaboration artifact, resume the collaborative session, or the like. The collaboration artifact and the corresponding associations can be stored as part of a project along with the development artifact(s).

Figure 1:
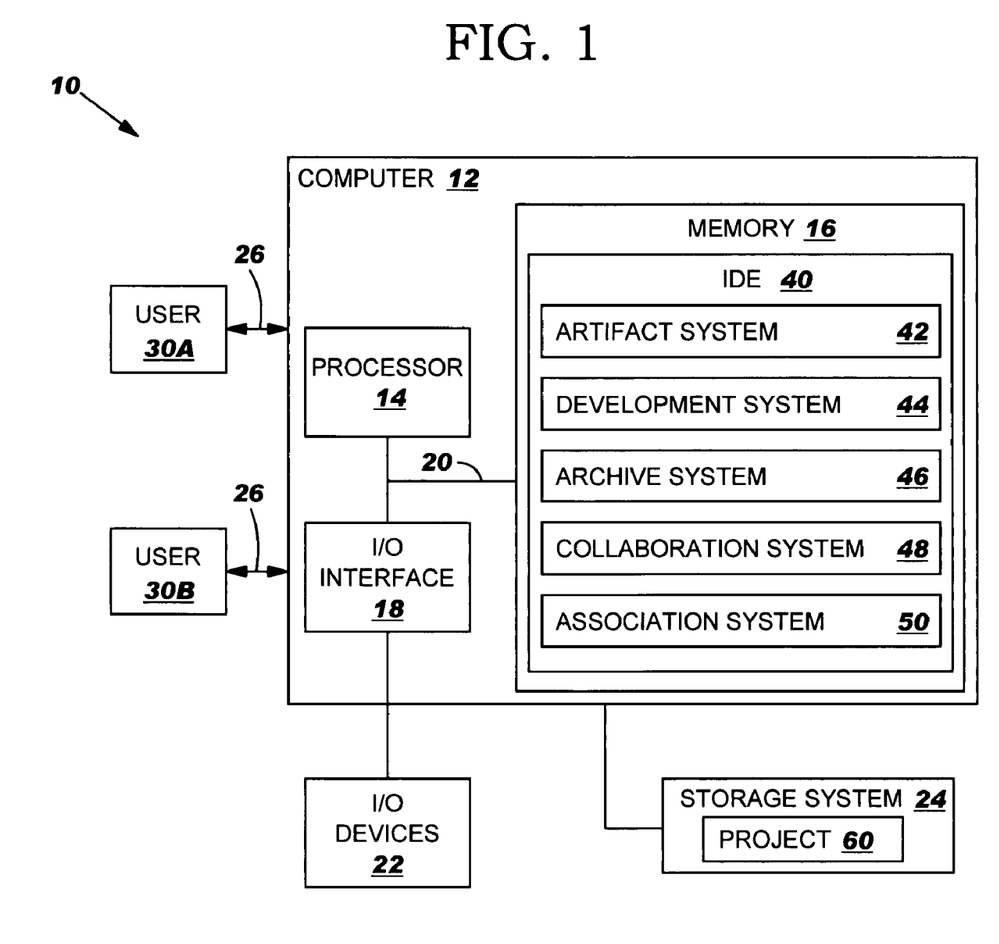
FIG. 1 shows an illustrative system for managing a project.

Turning to the drawings, FIG. 1 shows an illustrative system 10 for managing a project 60. In general, users 30A-B can develop project 60 using computer 12. For example, computer 12 can comprise an integrated development environment (IDE) 40 that allows users 30A-B to manage various data related to project 60. It is understood that project 60 can comprise any data that is created, developed, and/or managed by one or more users 30A-B to complete a goal. For example, project 60 can comprise computer program code developed for a software product, computer aided design (CAD) drawing files for a structure or computing device, etc. Further, project 60 can comprise data for planning, scheduling, designing, documenting, etc., the goal(s) for project 60.

When developing project 60, users 30A-B can collaborate with each other and/or interact with IDE 40. In one embodiment, one or more users 30A-B can use a computing device (not shown) that communicates with computer 12 and/or another computing device over one or more networks 26 to collaborate and/or access IDE 40. In this case, each network 26 can comprise any type of communications link. For example, network 26 can comprise an addressable connection in a client-server (or server-server) environment that may utilize any combination of wireline and/or wireless transmission methods. To this extent, computer 12 and another computing device may utilize conventional network connectivity, such as Token Ring, Ethernet, WiFi or other conventional communications standards. Further, network 26 can comprise any combination of various types of networks, including the Internet, a wide area network (WAN), a local area network (LAN), a virtual private network (VPN), etc. Where users 30A-B communicate with computer 12 via the Internet, connectivity could be provided by conventional TCP/IP sockets-based protocol, and users 30A-B could utilize an Internet service provider to establish connectivity to computer 12.

In any event, computer 12 comprises any type of computing device capable of communicating with one or more other computing devices and/or interacting with one or more users 30A-B. For example, computer 12 can comprise a server, a desktop computer, a laptop, a handheld device, a mobile phone, a pager, a personal data assistant, etc. To this extent, computer 12 is shown including a processor 14, a memory 16, an input/output (I/O) interface 18, a bus 20, external I/O devices/resources 22, and a storage system 24. In general, processor 14 executes computer program code such as IDE 40, that is stored in memory 16 and/or storage system 24. While executing computer program code (e.g., IDE 40), processor 14 can read and/or write data to/from memory 16, storage system 24, and/or I/O interface 18. Bus 20 provides a communication link between each of the components in computer 12.

It is understood that computer 12 is only illustrative of various possible combinations of hardware. For example, processor 14 may comprise a single processing unit, or be distributed across one or more processing units in one or more locations, e.g., on a client and server. Similarly, memory 16 and/or storage system 24 can comprise any combination of various types of data storage and/or transmission media that reside at one or more physical locations. I/O interface 18 can comprise any system for exchanging information with one or more I/O devices 22 that can provide an interface with one or more users 30A-B and/or other computing devices. It is understood, however, that if computer 12 comprises a handheld device or the like, one or more I/O devices 22 (e.g., a display) could be contained within computer 12, and not as an external I/O device 22 as shown.

Figure 2:
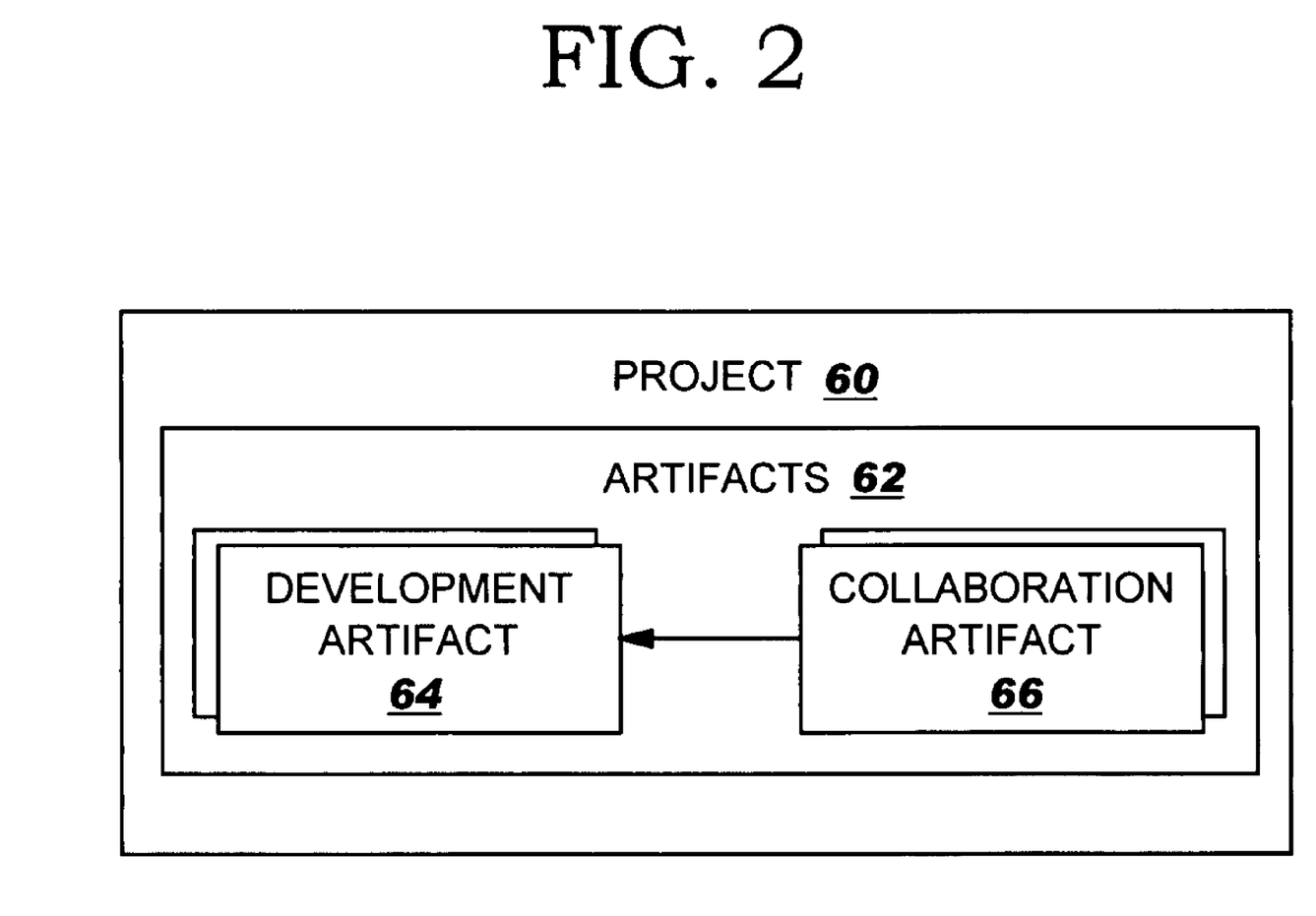
FIG. 2 shows an illustrative project according to one embodiment of the invention.

As noted above, project 60 comprises any type of data for meeting one or more goals. FIG. 2 shows an illustrative project 60 according to one embodiment of the invention. In particular, project 60 is shown including a set (one or more) of artifacts 62 that includes a set of development artifacts 64. Each development artifact 64 can comprise any combination of data that is typically stored and used in completing one or more goal(s) for project 60. For example, development artifact 64 can comprise a model, a source code file, a CAD diagram, function library, task, test case, activity, schedule, etc. To this extent, development artifact 64 can be stored on storage system 24 (FIG. 1) as one or more files, a database, one or more entries in a database, etc.

According to one embodiment of the invention, project 60 further includes collaboration data. For example, set of artifacts 62 is shown including a set of collaboration artifacts 66. Each collaboration artifact 66 can comprise data that is generated and stored when multiple users 30A-B (FIG. 1) collaborate regarding one or more development artifacts 64. To this extent, each collaboration artifact 66 can comprise text, audio and/or video, etc. Further, each collaboration artifact 66 can be associated with the corresponding one or more development artifacts 62. For example, project 60 can comprise a software project, and development artifact 64 can comprise a source code file. Collaboration artifact 66 can comprise data generated during a collaborative session between users 30A-B that is associated with the source code file (development artifact 64).

Returning to FIG. 1, in order to manage project 60, IDE 40 is shown including an artifact system 42 for managing the set of artifacts 62 (FIG. 2), a development system 44 for managing the set of development artifacts 64 (FIG. 2), and an archive system 46 for archiving the set of artifacts 62. Further, IDE 40 is shown including a collaboration system 48 for managing the set of collaboration artifacts 66 (FIG. 2) and an association system 50 for managing the associations between the set of collaboration artifacts 66 and the set of development artifacts 62. Operation of each of these systems is discussed further below.

However, it is understood that IDE 40 is only illustrative. As a result, some of the systems and/or functionality shown in IDE 40 may not be implemented and/or may be implemented separately. Further, additional systems and/or functionality may be included in IDE 40. For example, users 30A-B could each use a local IDE 40 that is implemented on a corresponding user device (not shown) for each user 30A-B. In this case, each user device could also store a local copy of project 60, and the user devices could communicate over a peer-to-peer network configuration to replicate development artifacts 64 (FIG. 2) and/or collaboration artifacts 66 (FIG. 2) as desired. Additionally, collaboration system 48 and/or association system 50 could be implemented apart from IDE 40 on another computer that is dedicated to managing collaborative artifacts and collaborative sessions but does not include IDE support capabilities.

As is known, IDE 40 is used to add, delete, modify, etc., artifacts 62 (FIG. 2) of project 60. To this extent, a user such as user 30A can use artifact system 42 to open project 60. Once project 60 is open, artifact system 42 can display a listing of some/all of the set of development artifacts 64 (FIG. 2) for project 60. User 30A can select from the listing a particular development artifact 64 that he/she desires to view and/or modify. In response, artifact system 42 can launch an appropriate tool in development system 44 for displaying development artifact 64. To this extent, development system 44 can comprise each tool necessary for displaying and/or editing development artifacts 64 such as a text editor, a drawing program, a database manager, planning software, etc. For example, when development artifact 64 comprises a source code file, a text editor in development system 44 can be used to display and/or modify the source code file.

Since development artifact 64 (FIG. 2) may go through several iterations of revisions by users 30A-B, archive system 46 can be used to maintain version control for the set of development artifacts 64. As is known, archive system 46 can allow each user 30A-B to "check out" a development artifact 64 that he/she desires to modify and "check in" a new version of the development artifact 64 after the modifications have been completed. Subsequently, other users 30A-B can synchronize a local copy of the development artifact 64 to include the new modifications.

When viewing and/or editing development artifact 64 (FIG. 2), user 30A may desire to collaborate with another user 30B regarding development artifact 64. To this extent, artifact system 42 can enable user 30A to initiate a collaborative session with user 30B. The collaborative session can be implemented using any type of communication tool such as an in-person conversation, electronic mail, a telephone conversation, a discussion forum, an instant messaging conversation (e.g., text chat, voice chat), and the like. In any event, the collaborative session generates data such as textual communications, recorded conversation, etc., that can be saved as collaboration artifact 66 (FIG. 2).

Figure 3:
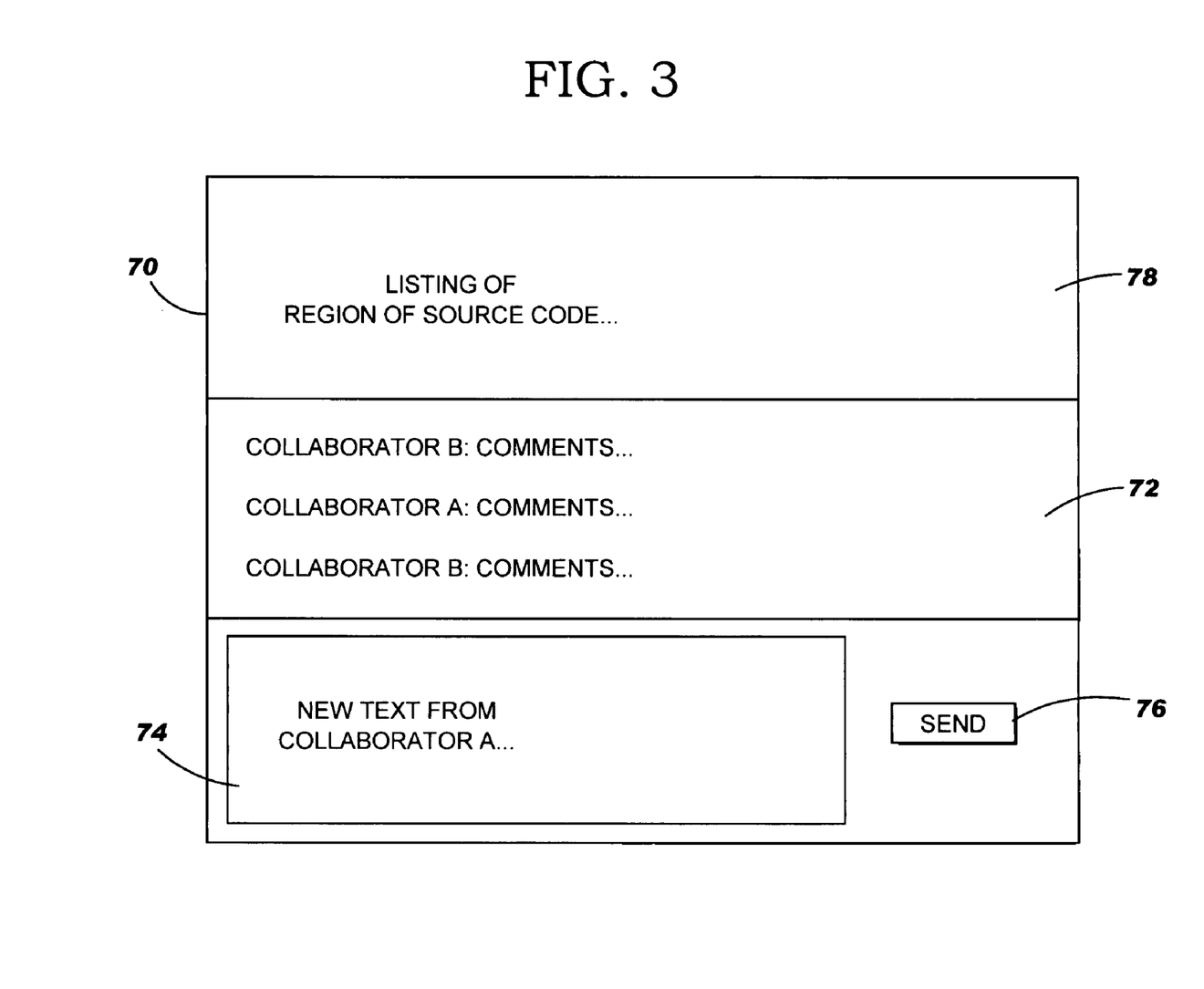
FIG. 3 shows an illustrative interface for a collaborative session.

Collaboration system 48 can manage the collaborative session and the corresponding collaborative data. FIG. 3 shows an illustrative interface 70 for the collaborative session. In this case, the collaborative session comprises an instant messaging conversation that is conducted using interface 70. As is known, interface 70 includes a discussion display area 72 and a text editor 74. Discussion display area 72 displays text entered by each collaborator (e.g., users 30A-B shown in FIG. 1), and text editor 74 allows each collaborator to add his/her own text to the discussion. A collaborator can then select send button 76 to add the text from editor 74 to the discussion shown in discussion display area 72.

As noted previously, the collaborative session may discuss one or more particular development artifacts 64 (FIG. 2). To this extent, interface 70 can assist the collaborative session based on the corresponding one or more development artifacts 64. For example, interface 70 is shown including an artifact display area 78 for displaying all or a region of a corresponding development artifact 64. For example, user 30A (FIG. 1) could select development artifact 64 and initiate a collaborative session with user 30B (FIG. 1). In this case, development artifact 64 can be displayed in artifact display area 78. This enables all collaborators (e.g., users 30A-B) to easily refer to the development artifact 64 that is being discussed.

Additionally, context information available in IDE 40 (FIG. 1) also can be used to assist the collaborative session. For example, development system 44 (FIG. 1) can comprise a text editor to edit program code for a software product. The text editor can use context information to link to the definition of a function, auto-complete object, variable and/or function names, provide a tool tip that lists function variables, etc. In this case, editor 74 for interface 70 can include the same functionality. Additional functionality, such as auto-completing a line in the associated program code also can be included in editor 74. Similar functionality can be incorporated for other types of projects. For example, when project 60 (FIG. 1) comprises a circuit diagram, display area 78 can display a region of the circuit diagram and editor 74 can auto-complete a name of a part in the circuit diagram, display a tooltip comprising a pin layout for the part, etc.

In one embodiment, users 30A-B (FIG. 1) may collaborate regarding a region of development artifact 64 (FIG. 2), rather than the entire development artifact 64. In this case, artifact display area 78 can display only the appropriate region of development artifact 64. For example, user 30A could use an editor in development system 44 (FIG. 1) to select a region of development artifact 64. Subsequently, user 30A can initiate a collaborative session with user 30B, and the selected region of development artifact 64 can be provided to collaboration system 48 (FIG. 1) for display in artifact display area 78. It is understood that various approaches are possible for selecting a region of development artifact 64. For example, a software function that is currently being displayed/edited can be provided as the region. Further, it is understood that multiple regions from one or more development artifacts 64 could be selected and displayed in artifact display area 78. For example, a definition of a function referenced in a highlighted region could be provided and displayed in artifact display area 78.

It is understood that one or more regions of development artifact(s) 64 (FIG. 2) could be provided for display in artifact display area 78 after the collaborative session has started. To this extent, artifact display area 78 and/or discussion display area 72 can include functionality such as linking, etc., as discussed above with reference to editor 74 that would enable the ready selection of an additional region and/or development artifact 64. Further, it is understood that while interface 70 is shown including a distinct discussion display area 72 and artifact display area 78, interface 70 could include a single display area that displays both the development artifact 64 data and the collaboration discussion data.

In any event, collaboration system 48 (FIG. 1) can record the collaborative session. Once the collaborative session is complete, collaboration system 48 can store the recording of the collaborative session as collaboration artifact 66 (FIG. 2). Subsequently, association system 50 (FIG. 1) can store and manage an association between collaboration artifact 66 and the corresponding development artifact(s) 64 (FIG. 2). As shown in FIG. 2, collaboration artifact 66 and the corresponding associations with development artifact(s) 64 can be included in set of artifacts 62 for project 60. When only one or more regions of development artifact(s) 64 are discussed during the collaborative session, collaboration artifact 66 can be associated with the particular region(s) rather than the development artifact(s) 64 as a whole. This allows users 30A-B (FIG. 1) to more readily determine the relevancy of collaboration artifact 66.

Figure 4:
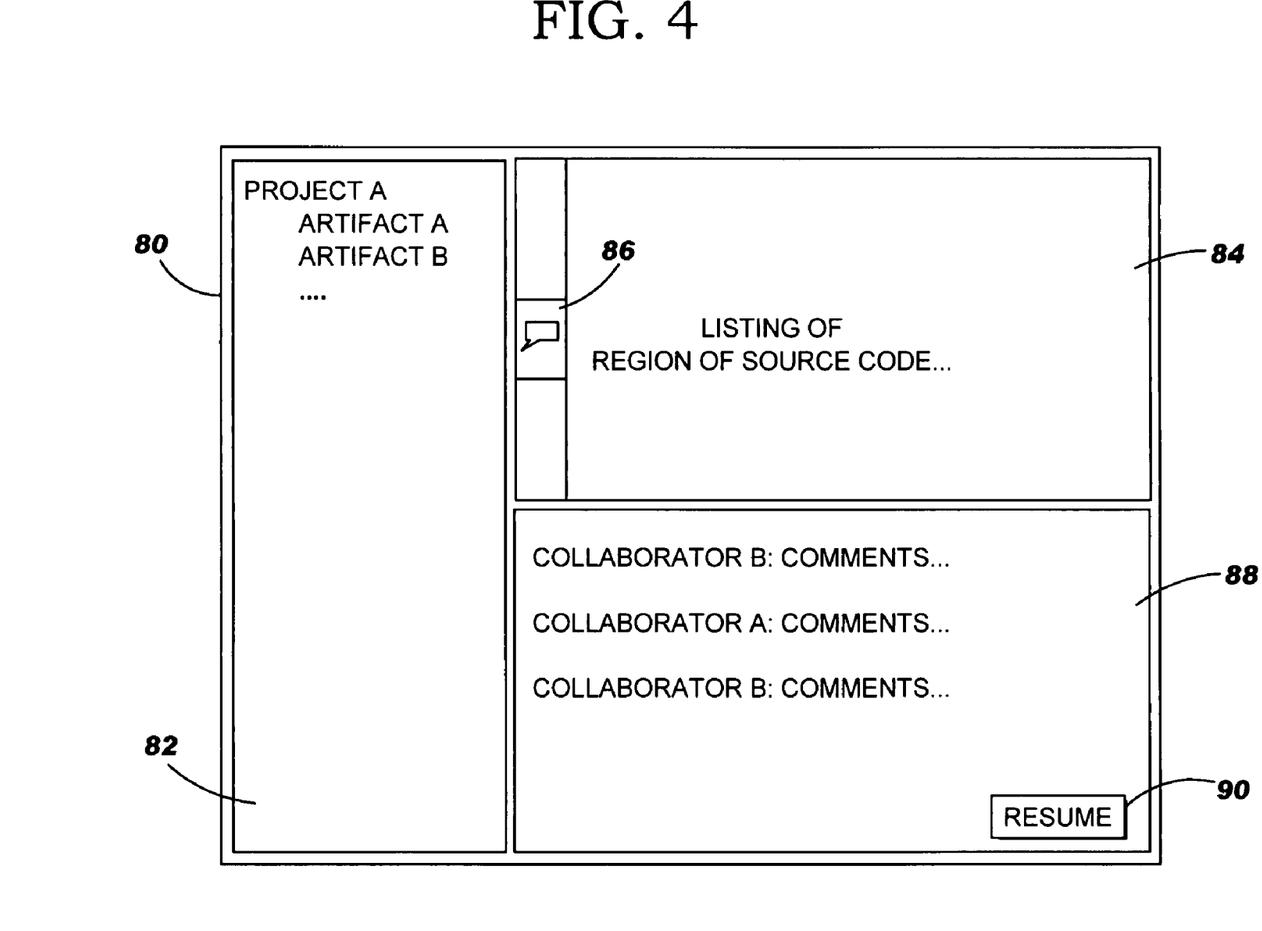
FIG. 4 shows an illustrative interface for displaying a project.

In one embodiment of the invention, development artifact 64 (FIG. 2) is annotated with collaboration artifact 66 (FIG. 2). For example, FIG. 4 shows an illustrative interface 80 for displaying project 60 (FIG. 1). Interface 80 can be generated by artifact system 42 (FIG. 1) and can comprise a display area 82 for displaying some or all of set of artifacts 62 (FIG. 2) for project 60. User 30A (FIG. 1) can select development artifact 64 using display area 82 and in response, development system 44 (FIG. 1) can display the selected development artifact 64 in an editor 84.

When a collaborative session has previously been conducted regarding all or a region of development artifact 64 (FIG. 2), editor 84 can display an indicator 86 for the collaboration artifact 66 (FIG. 2) that is associated with development artifact 64. To this extent, indicator 86 can comprise an indication of the region of development artifact 64 for which collaboration artifact 66 is relevant. It is understood that indicator 86 is only illustrative of various possible indicators. Further, it is understood that indicator 86 could be altered based on the type of collaborative session, based on the number of development artifacts 64/regions that are relevant to collaboration artifact 66, based on an age of collaboration artifact 66, etc.

In any event, when user 30A desires to view/listen to collaboration artifact 66 (FIG. 2), user 30A can select indicator 86. In response, collaboration system 48 (FIG. 1) can generate a display area 88 that displays collaboration artifact 66. Alternatively, collaboration system 48 could play an audio file, video file, etc., that corresponds to collaboration artifact 66. As shown, display area 88 can display text that was generated during a collaborative session (e.g., instant messaging) to allow user 30A to review the contents. Further, display area 88 could allow user 30A to edit the text. For example, user 30A could add clarifying text, remove text that is no longer relevant, etc. To this extent, display area 88 and/or editor 84 could comprise functionality that incorporates context information for project 60 (FIG. 1) as discussed above (e.g., autocomplete, linking, etc.). Access to various other operations can be provided to user 30A using indicator 86. For example, user 30A could be allowed to delete the collaboration artifact 66 that corresponds to indicator 86. In this case, indicator 86 would also be removed after collaboration artifact 66 has been deleted.

Further, display area 88 can allow user 30A (FIG. 1) to perform one or more operations on collaboration artifact 66. For example, user 30A can use display area 88 to resume a previous collaborative session. In this case, a resume button 90 can be included in display area 88 that, when selected, can initiate a collaborative session between user 30A and one or more other users. In response, the data in collaboration artifact 66 (FIG. 2) can be displayed in display area 72 (FIG. 3) for the collaborative session, and newly added text can be concatenated on the end of the previous text. An ability to resume a previous collaborative session can be based on an availability each user 30A-B that previously participated in the collaborative session. For example, collaboration system 48 (FIG. 1) can first determine if each user 30A-B is currently available on a network 26 (FIG. 1) before displaying the resume button 90. Further, since collaboration artifact 66 could undergo modification, archive system 46 (FIG. 1) could maintain version control for collaboration artifact 66.

As discussed herein, the invention allows any user 30A-B that has permission to access development artifact 64 (FIG. 2) to readily access a corresponding collaboration artifact 66 (FIG. 2). As a result, the results of the collaborative session can be efficiently propogated to other users 30A-B that are viewing/modifying the same development artifact 64 but did not participate in the collaborative session. Further, any user 30A-B could be allowed to revise, resume, etc., the collaborative session regardless of whether he/she participated in the original collaborative session. Still further, once a new collaborative artifact 66 has been generated, other users 30A-B could be notified of its availability (e.g., when he/she opens the corresponding development artifact 64) and could choose to access the new collaborative artifact 66. It is understood that various alternatives are possible. For example, one or more of the original collaborators could adjust the permission to perform various operations such as viewing, editting, resuming, etc., that can be performed on the collaborative artifact 66.

While the invention has been primarily shown and described as annotating a development artifact 64 (FIG. 2) with collaboration data, it is understood that user 30A (FIG. 1) could annotate development artifact 64 with a note. For example, user 30A may want to add an informal note about the functionality implemented in a region of source code. In this case, user 30A could select the region and use an editor such as editor 74 (FIG. 3) to generate the note and save it as a collaboration artifact 66 (FIG. 2) that is associated with the region of development artifact 64.

Still yet, it should be appreciated that the teachings of the present invention could be offered as a business method on a subscription or fee basis. For example, IDE 40 (FIG. 1) could be created, maintained, supported, and/or deployed by a service provider that offers the functions described herein for customers. That is, a service provider could offer to manage project 60 (FIG. 1) as described above. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, while the invention has primarily been shown and described in conjunction with a software project and collaboration using instant messaging, it is understood that the teachings of the invention can be readily applied to other types of projects and collaboration tools.

What is claimed is:

1. A method of managing a project, the method comprising:
    managing, using a computing device, data for the project, the data including a set of artifacts included in the project;
    managing, using the computing device, a set of development artifacts included in the set of artifacts for the project, each development artifact comprising data that is used in completing at least one goal for the project; and
    managing, using the computing device, an integrated development environment (IDE) that enables at least one user to develop the project, the IDE being configured to:
        open the project;
        display a listing of the set of development artifacts in the project;
        display the data for at least one of the set of development artifacts in response to a selection of the at least one of the set of development artifacts in the listing;
        manage a collaborative session between a plurality of users, the managing including storing collaborative data for the collaborative session in a collaboration artifact in the set of artifacts for the project and storing an association between the collaboration artifact and a development artifact in the set of artifacts for the project, wherein the association is stored separately from the development artifact; and
        display an indicator for a previous collaborative session that is associated with a development artifact that is displayed; wherein the IDE is further configured to maintain version control for each development artifact, collaboration artifact, and association in the set of artifacts for the project.

2. The method of claim 1, wherein the association associates the collaboration artifact with a region of the development artifact, and wherein the indicator includes an indication of the region.

3. The method of claim 1, wherein the IDE launches an instant messaging conversation for the collaborative session.

4. The method of claim 1, wherein the IDE is further configured to manage a note for a development artifact, the note only including data provided by a single user, the managing including storing data for the note as a collaboration artifact in the set of artifacts and storing an association between the collaboration artifact and the development artifact in the set of artifacts.

5. The method of claim 1, wherein the IDE is further configured to display data stored in a collaboration artifact and resume a collaboration session for the collaboration artifact.

6. The method of claim 1, wherein the project is a software project and wherein the set of development artifacts includes at least one source code file.

7. A method of managing a software project, the method comprising:
    managing, using a computing device, data for the software project, the data including a set of artifacts included in the software project;
    managing, using the computing device, a set of source code files included in the set of artifacts for the software project; and
    managing, using the computing device, an integrated development environment (IDE) that enables at least one user to develop the software project, the IDE being configured to:
        open the project;
        display a listing of the set of source code files in the project;
        display data for at least one of the set of source code files in response to a selection of the at least one of the set of source code files in the listing;
        manage a collaborative session between a plurality of users for at least one of the set of source code files, the managing including storing collaborative data for the collaborative session in a collaboration artifact in the set of artifacts for the project and storing an association between the collaboration artifact and the at least one of the set of source code files in the set of artifacts for the project, wherein the association is stored separately from the at least one of the set of source code files; and
        display an indicator for a previous collaborative session that is associated with a source code file that is displayed; wherein the IDE is further configured to maintain version control for each artifact in the set of artifacts for the project.

8. The method of claim 7, wherein the association associates the collaboration artifact with a region of the source code file, and wherein the indicator includes an indication of the region.

9. The method of claim 7, wherein the IDE is further configured to manage a note for a source code file, the note only including data provided by a single user, the managing including storing data for the note as a collaboration artifact in the set of artifacts and storing an association between the collaboration artifact and the source code file in the set of artifacts.

10. The method of claim 7, wherein the IDE is further configured to display data stored in a collaboration artifact and resume a collaboration session for the collaboration artifact.

11. The method of claim 7, wherein the IDE is further configured to display a listing, display data, manage a collaborative session, and display an indicator for at least one additional type of development artifact.

* * * * *